(12) United States Patent
Huang et al.

(10) Patent No.: US 11,551,122 B2
(45) Date of Patent: Jan. 10, 2023

(54) INFERENCING ENDPOINT DISCOVERY IN COMPUTING SYSTEMS

(71) Applicant: Microsoft Technology Licensing, LLC, Redmond, WA (US)

(72) Inventors: Hao Huang, Kenmore, WA (US); Zhenghua Yang, Sammamish, WA (US); Long Qiu, Kirkland, WA (US); Ashish Pinninti, Redmond, WA (US); Juan Diego Ferre, Seattle, WA (US); Amit Anand Amleshwaram, Wynnewood, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 17/193,753

(22) Filed: Mar. 5, 2021

(65) Prior Publication Data

US 2022/0284322 A1 Sep. 8, 2022

(51) Int. Cl.
*G06N 5/04* (2006.01)
*G06F 16/24* (2019.01)
(Continued)

(52) U.S. Cl.
CPC .............. *G06N 5/04* (2013.01); *G06F 16/24* (2019.01); *G06F 16/29* (2019.01); *G06N 20/00* (2019.01); *H04L 67/10* (2013.01)

(58) Field of Classification Search
CPC .......... G06N 5/04; G06N 20/00; G06F 16/24; G06F 16/29; H04L 67/10
See application file for complete search history.

(56) References Cited

U.S. PATENT DOCUMENTS 5,842,202 A * 11/1998 Kon ..................... G06F 16/217
707/999.005
8,311,967 B1 11/2012 Lin et al.
(Continued)

FOREIGN PATENT DOCUMENTS

WO 2019018482 A1 1/2019

OTHER PUBLICATIONS

"Minimizing Real-Time Prediction Serving Latency in Machine Learning", Retrieved From: https://web.archive.org/web/20200814122433/https://cloud.google.com/solutions/machine-learning/minimizing-predictive-serving-latency-in-machine-learning, Aug. 14, 2020, 9 Pages.
(Continued)

*Primary Examiner* — El Hadji M Sall
(74) *Attorney, Agent, or Firm* — Christopher J. Volkmann; Kelly, Holt & Christenson, PLLC (57) ABSTRACT

Techniques for machine learning inferencing endpoint discovery in a distributed computing system are discloses herein. In one example, a method includes searching a database containing machine learning endpoint records having data representing values of execution latency or prediction accuracy corresponding inferencing endpoints deployed in the distributed computing system. The method also includes generating a list of inferencing endpoints matching the individual target values and determining whether a count of the inferencing endpoints in the generated list exceeds a preset threshold. In response to determining that the identified count does not exceed the preset threshold, the method includes instantiating one or more additional inferencing endpoints in the distributed computing system based on the individual target values in the received query.

20 Claims, 7 Drawing Sheets

(51) Int. Cl.
  *H04L 67/10* (2022.01)
  *G06N 20/00* (2019.01)
  *G06F 16/29* (2019.01)

(56) References Cited

U.S. PATENT DOCUMENTS

| | | | |
|---|---|---|---|
| 9,992,025 B2* | 6/2018 | Mahaffey | G06F 21/577 |
| 10,033,600 B2 | 7/2018 | Hall et al. | |
| 10,102,480 B2 | 10/2018 | Dirac et al. | |
| 11,100,373 B1* | 8/2021 | Crosby | G16H 30/40 |
| 11,259,183 B2* | 2/2022 | Richardson | H04W 12/37 |
| 2004/0243588 A1* | 12/2004 | Tanner | G06F 16/2471 |
| 2013/0297547 A1* | 11/2013 | Ding | H04M 1/72448 706/46 |
| 2019/0138908 A1 | 5/2019 | Bernat et al. | |
| 2019/0164080 A1 | 5/2019 | Stefani et al. | |
| 2019/0294983 A1 | 9/2019 | Rahnama | |
| 2020/0104750 A1 | 4/2020 | Kandoi et al. | |
| 2020/0210867 A1 | 7/2020 | Banis et al. | |
| 2020/0302271 A1* | 9/2020 | Ovtcharov | G06F 7/483 |
| 2020/0356415 A1 | 11/2020 | Goli | |

OTHER PUBLICATIONS

Wang, et al., "Copy and Transform Data in Azure Cosmos DB (SQL API) by Using Azure Data Factory", Retrieved From: https://docs.microsoft.com/en-us/azure/data-factory/connector-azure-cosmos-db, Dec. 11, 2019, 7 Pages.

"Endpoint Search", Retrieved From: https://web.archive.org/web/20210228030034/https://docs.globus.org/api/transfer/endpoint_search/, Feb. 28, 2021, 4 Pages.

"Globus Connect Server", Retrieved From: https://web.archive.org/web/20200510235055/https://docs.globus.org/globus-connect-server/, May 10, 2020, 3 Pages.

"Transfer API Documentation", Retrieved From: https://web.archive.org/web/20201018165413/https://docs.globus.org/api/transfer/, Oct. 18, 2020, 3 Pages.

"International Search Report and Written Opinion Issued in PCT Application No. PCT/US22/017388", dated May 23, 2022, 13 Pages.

* cited by examiner

INFERENCING ENDPOINT DISCOVERY IN COMPUTING SYSTEMS

BACKGROUND

In computing, machine learning involves computer algorithms that are trained to improve through experiencing known data. Machine learning can be used to build software models to make predictions without being explicitly programmed to do so. For example, a set of digital images with previously identified items, such as buildings, cars, people, etc., can be used to train a computer algorithm for a model that can be used to predictively identify unknown items in additional digital images. In another example, digitized voice data and corresponding text can be used to train another computer algorithm for a model that can be used to convert additional voice data into words.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some computing systems, instances of different machine learning models can be deployed as inferencing endpoints to perform predictions. The deployed inferencing endpoints can have different prediction accuracy, execution latency, and/or other characteristics depending on training data used, model architecture, model versions, or other parameters. In certain implementations, a computing system can instantiate a new inferencing endpoint upon receiving a request from an application. Overtime, the computing system can host very large numbers of inferencing endpoints. Such an instantiation scheme can be wasteful in computing resources because deployed inferencing endpoints can often be repurposed to serve additional requests. However, discovering what is available from thousands or even millions of inferencing endpoints can be difficult for users.

Several embodiments of the disclosed technology are directed to a model directory service configured to monitor and track deployed inferencing endpoints in a computing system. The model directory service can also be configured to allow users to search for available inferencing endpoints and facilitate access to one or more user selected inferencing endpoints. In certain embodiments, a model directory service can be configured to collect metadata of a deployed inferencing endpoint upon detecting that the inferencing endpoint is deployed in the computing system. The model directory service can then insert and/or format the collected metadata into a data structure and store the data structure with the collected metadata as a database record in a database. Example metadata can include training data used, model architecture, model versions, prediction accuracy, execution latency, deployment location (physical and/or logical), date/time deployed, current health status, and/or other suitable characteristics. In other embodiments, an external computing service can be configured to collect and store the metadata as database records in the database while providing access to the database records to the model directory service.

The model directory service can also be configured to allow search of a list of available inferencing endpoints based on user supplied criteria. In certain embodiments, a user can first submit credentials to an authentication service in the computing system. Upon successful authentication, the authentication service to issue to the user an authentication token. In certain implementations, with the authentication token, the user can then call an Application Programming Interface (API) of the model directory service with a query for a list of available inferencing endpoints. The query can also include data representing various desired parameters for the inferencing endpoints such as, for instance, execution latency, prediction accuracy, cost of performing prediction (e.g., in dollars per request), and/or other suitable parameters. In other implementations, the query can also include an identification of a physical location, an access clearance, a priority, and/or other information of the user. In further implementations, the user can invoke the model directory service in other suitable manners.

In response to receiving the query from the user, the model directory service can be configured to verify the authentication token and upon successful verification, query the database for database records with metadata that satisfy the various parameters supplied by the user. For example, the model directory service can be configured to implement fuzzy logic to locate one or more inferencing endpoints having an execution latency of 50 to 100 milliseconds, a prediction accuracy of 80% to 90%, a cost of performing prediction of 0.10 dollars per request, and/or other suitable criteria. In other examples, the model directory service can also be configured to determine, from the received query, a physical location of the user, and locate one or more inferencing endpoints that are geographically closest to the physical location of the user. In further examples, the model directory service can also be configured to filter the inferencing endpoints for privacy and/or government compliance. For instance, due to privacy and/or government compliance concerns, some inferencing endpoints may not be available to users in certain physical locations.

Upon obtaining the list of inferencing endpoints, the model directory service can be configured to provide the list of inferencing endpoints along with available authentication mechanisms to access the inferencing endpoints to the user. In certain embodiments, the model directory service can be configured to provide a Universal Resource Locator (URL) and a certificate thumbprint corresponding to each of the inferencing endpoints in the list. Upon receiving the list, the user can locate a suitable authentication certificate from, for instance, a local store, and access one of the inferencing endpoints at a corresponding URL with the authentication certificate. In other embodiments, the model directory service can also be configured to provide the list of inferencing endpoints ranked based on a geographical distance from the physical location of the user, an execution latency, a prediction accuracy, or other suitable criteria, for selection by the user.

In further embodiments, the model directory service can be configured to determine a count of the inferencing endpoints in the list and whether the determined number is equal or exceed a preset threshold. In response to determine that the count of inferencing endpoints in the list is less than the preset threshold, in certain implementations, the model directory service can be configured to prompt the user to modify the previously supplied search criteria to, for instance, broaden ranges for the search. For instance, instead of a prediction accuracy of 80% to 90%, the prediction accuracy can be set to 70% to 90%. After receiving modified search criteria, the model directory service can then re-query the database with the modified criteria and determine whether a new count of inferencing endpoints in the list is equal or exceed the preset threshold. The foregoing operations can be repeated until the count of inferencing endpoints in the list is not less than the preset threshold.

In other embodiments, in addition to or in lieu of prompting the user to modify the search criteria, the model directory service can be configured to generate and transmit an instruction to, for instance, a platform controller to instantiate a new inferencing endpoint. In certain implementations, the new inferencing endpoint can be instantiated based on search criteria supplied by the user. For instance, in the example above, the new inferencing endpoint can be instantiated to have characteristics of an execution latency of 50 to 100 milliseconds, a prediction accuracy of 80% to 90%, a cost of performing prediction of 0.10 dollars per request. Upon receiving a notification that the new inferencing endpoint is instantiated, the model directory service can be configured to provide the instantiated new inferencing endpoint to the user. In further implementations, multiple new inferencing endpoints can be instantiated such that the total number of inferencing endpoints in the list is not less than the preset threshold.

Several embodiments of the disclosed technology can allow efficient discovery and access of inferencing endpoints in computing systems. By recording and tracking the deployed inferencing endpoints, the model directory service can efficiently provide inferencing endpoints that are suitable to desired parameters of the user. Instead of trying out each inferencing endpoint, the user can readily determine, from the provided list, a most suitable inferencing endpoint. The model directory service can also reduce resource consumption in the computing system. For example, instead of instantiating a new inferencing endpoint in response to every request from the user, an existing inferencing endpoint that satisfies the requirements of the user can be provided. As such, compute, storage, network, and/or other suitable types of resources in the computing system can be reduced.

DETAILED DESCRIPTION

Certain embodiments of systems, devices, components, modules, routines, data structures, and processes for efficient inferencing endpoint discovery in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

Many terminologies are used herein to illustrate various aspects of the disclosed technology. Such terminologies are intended as examples and not definitions. For instance, a distributed computing system can be a computing facility having a computer network interconnecting a plurality of host machines or hosts to one another or to external networks (e.g., the Internet). An example of such a computing facility can include a datacenter for providing cloud computing services. A compute network can include a plurality of network devices. A network device can be a physical network device, examples of which include routers, switches, hubs, bridges, load balancers, security gateways, or firewalls. A host or host device can include a computing device that is configured to implement, for instance, one or more virtual machines, containers, or other suitable virtualized components. For example, a host can include a remote server having a hypervisor configured to support one or more virtual machines, containers, or other suitable types of virtual components. In another instance, a host can also include a desktop computer, a laptop computer, a smartphone, a web-enabled appliance (e.g., a camera), or other suitable computing devices configured to implement one or more containers or other suitable types of virtual components.

In another example, a hypervisor can include computer software, firmware, and/or hardware that creates, manages, and runs one or more virtual machines on a host machine. A virtual machine or VM is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

In another example, a computing service or cloud service can include one or more computing resources provided over a computer network such as the Internet. Example cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally includes delivery of operating systems and associated services over the computer network without requiring downloads or installation. IaaS generally includes outsourcing equipment used to support storage, hardware, servers, network devices, or other components, all of which are made accessible over a computer network.

In addition, an inferencing endpoint is a computer application executed on a server or other suitable types of computing device to provide a prediction or other suitable types of computing service. An inferencing endpoint is configured to predict a target outcome based on a corresponding machine learning model. For example, an inferencing endpoint can be configured to predictively identify unknown items in digital images based on a machine learning model. In further examples, another inferencing endpoint can be configured to convert voice data into text data based on another machine learning model. Different inferencing endpoints can have different capabilities depending on training data used, model architecture, model versions, or other parameters. For example, inferencing endpoints can have corresponding prediction accuracy, execution latency, and/or other characteristics.

In certain computing systems, large numbers of inferencing endpoints can be deployed to serve requests from users. However, discovering what is available from thousands or even millions of inferencing endpoints can be difficult for users. Several embodiments of the disclosed technology are directed to a model directory service that is configured to facilitate efficient discovery and access of inferencing endpoints in computing systems. In certain implementations, the model directory service can be configured to track deployed inferencing endpoints and allow users to search for a list of inferencing endpoints based on user supplied criteria. As such, efficient discovery and access of suitable inferencing endpoints can be achieved in the computing systems, as described in more detail below with reference to FIGS. 1-6.

Figure 1:
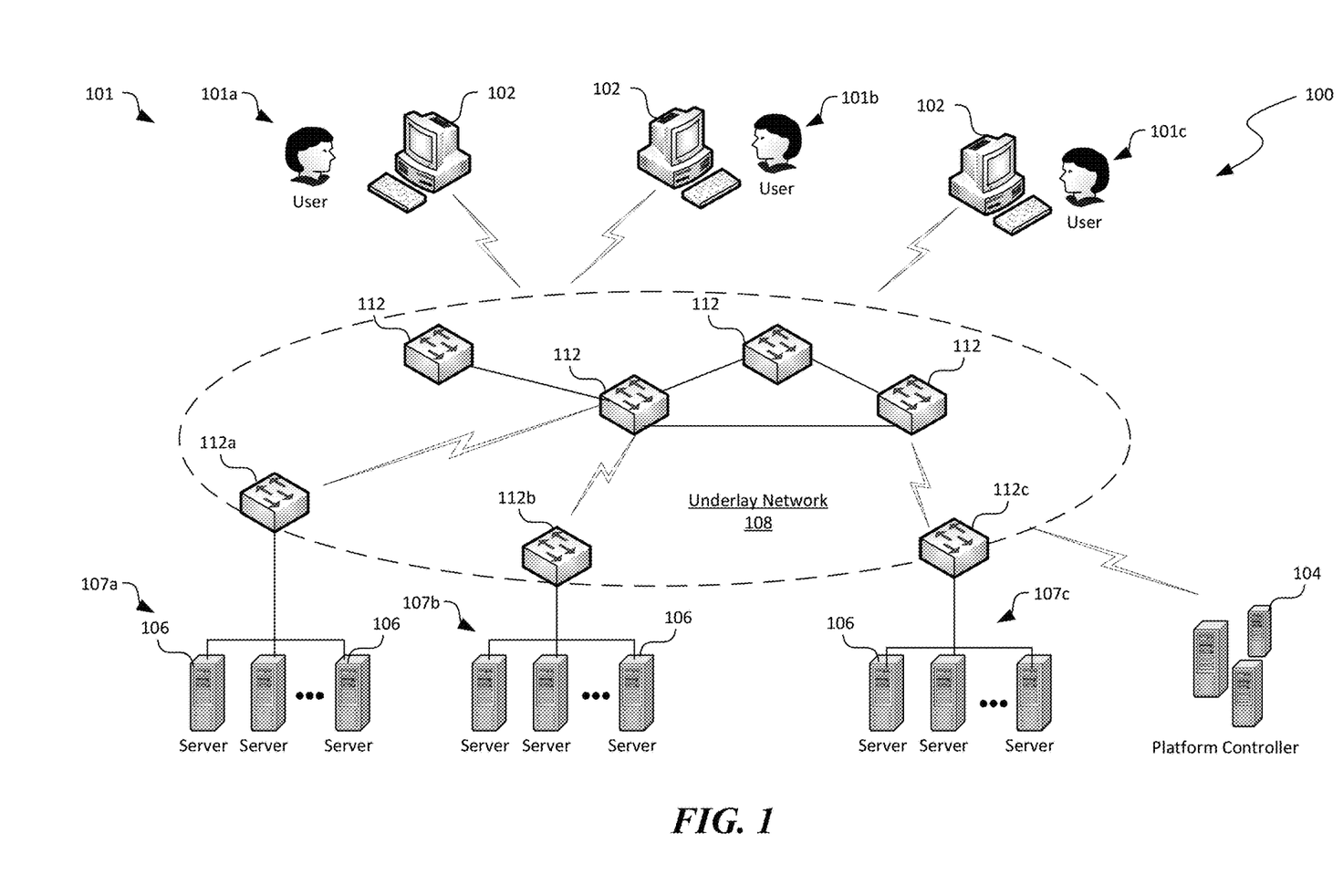
FIG. 1 is a schematic diagram illustrating a distributed computing system implementing inferencing endpoint discovery in the distributed computing system in accordance with embodiments of the disclosed technology.

FIG. 1 is a schematic diagram illustrating a distributed computing system 100 implementing client-side interaction data processing in accordance with embodiments of the disclosed technology. As shown in FIG. 1, the distributed computing system 100 can include a computer network (shown as an "underlay network 108") interconnecting a plurality of servers 106, a plurality of client devices 102 of users 101, and a platform controller 104 operatively coupled to one another. The platform controller 104 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The underlay network 108 can allow communications among the servers 106 and the client devices 102. In other embodiments, the multiple host machine sets 107a-107c can share a single network device 112 or can have other suitable arrangements.

The servers 106 can individually be configured to provide compute, storage, communication, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable applications 147 (shown in FIG. 2) for performing computation, communication, and/or other suitable tasks. For instance, the executed application 147 can individually provide computing services as an inferencing endpoint. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 to access various computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 to access cloud and/or other suitable types of computing services provided by the servers 106 and/or other components in the distributed computing system 100.

Figure 2:
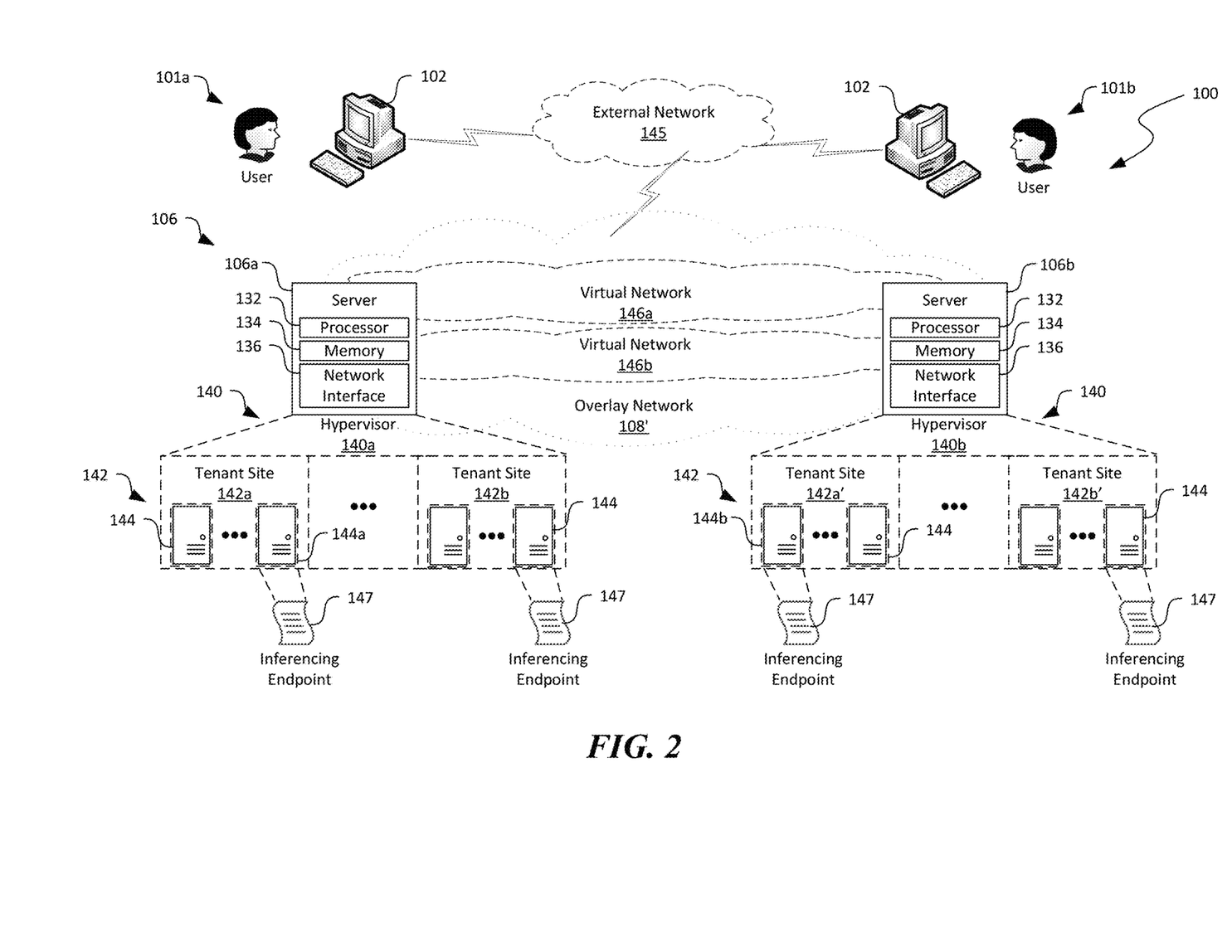
FIG. 2 is a schematic diagram illustrating certain example hardware/software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, a first server 106a and a second server 106b can each include a processor 132, a memory 134, and a network interface 136 operatively coupled to one another. The processor 132 can include one or more central processing units, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 6. The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the processor 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. Though the hypervisors 140 are individually shown as software components in FIG. 2, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications 147 or processes corresponding to an operating system, middleware, and/or suitable applications. The executed applications 147 can each correspond to one or more computing services. Examples of such computing services can include platform services, microservices, authentication services, or other suitable types of computing services. As discussed in more detail below with reference to FIGS. 3A-3D, the executed applications 147 can also provide a model directory service 150 (shown in FIG. 3A) that is configured to facilitate discovery of inferencing endpoints deployed in the distributed computing system 100.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines 144 and/or applications 147 executing in the virtual machines 144. For example, the processor 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 to provide suitable computing services to the users 101.

FIGS. 3A-3D are schematic diagrams illustrating certain operations of inferencing endpoint discovery in the distributed computing system of FIG. 1 in accordance with embodiments of the disclosed technology. In FIGS. 3A-3D and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
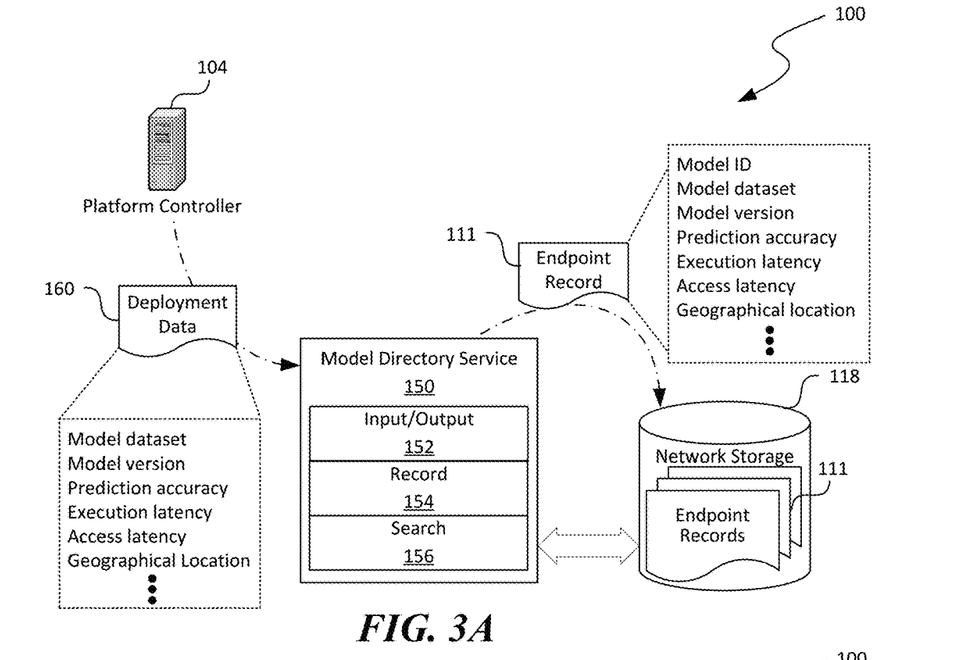
FIGS. 3A-3D are schematic diagrams illustrating certain operations of inferencing endpoint discovery in the distributed computing system of FIG. 1 in accordance with embodiments of the disclosed technology.

As shown in FIG. 3A, the distributed computing system 100 can include a model directory service 150 operatively coupled to a network storage 118 containing endpoint records 111. The model directory service 150 can be configured to track deployed inferencing endpoints in the distributed computing system 100. In the illustrated embodiment, the model directory service 150 can include an input/output component 152, a record component 154, and a search component 156 operatively coupled to one another. In other embodiments, the model directory service 150 can include a database, network, or other suitable types of component in addition to or in lieu of those shown in FIG. 3A.

As shown in FIG. 3A, in certain implementations, upon deploying an inferencing endpoint, the platform controller 104 can transmit data representing deployment data 160 to the model directory service 150. The deployment data 160 can include a model dataset used to train the model, a model version, a prediction accuracy, an execution latency, an access latency, a geographical location, and/or other suitable information regarding the inferencing endpoint. Upon receiving the deployment data 160, the input/output component 152 can be configured to pre-process the deployment data 160. For instance, the input/output component 152 can be configured to verify authenticity and/or validity of the deployment data, verify that the deployment data 160 is in a target format, and/or perform other suitable operations. Upon pre-processed the deployment data 160, the input/output component 152 can be configured to forward the deployment data 160 to the record component 154 for further processing. In other implementations, the record component 154 can be configured to query the platform controller 104 for the deployment data 160 periodically or in other suitable manners in addition to or in lieu of the platform controller 104 transmitting the deployment data 160 to the model directory service 150.

The record component 154 can be configured to generate a database record (shown in FIG. 3A as endpoint record 111) having a preconfigured data structure to contain the received deployment data 160. For example, as shown in FIG. 3A, the endpoint record 111 can include data fields configured to contain a model ID, a model dataset, a model version, a prediction accuracy, an execution latency, an access latency, a geographical location at which the inferencing endpoint is deployed, and/or other suitable information. In other examples, the record component 154 can be configured to generate the endpoint record 111 having other suitable structured or non-structured data. Upon generating the endpoint record 111, the record component 154 can be configured to store the generated endpoint record 111 in the network storage 118.

Figure 3B:
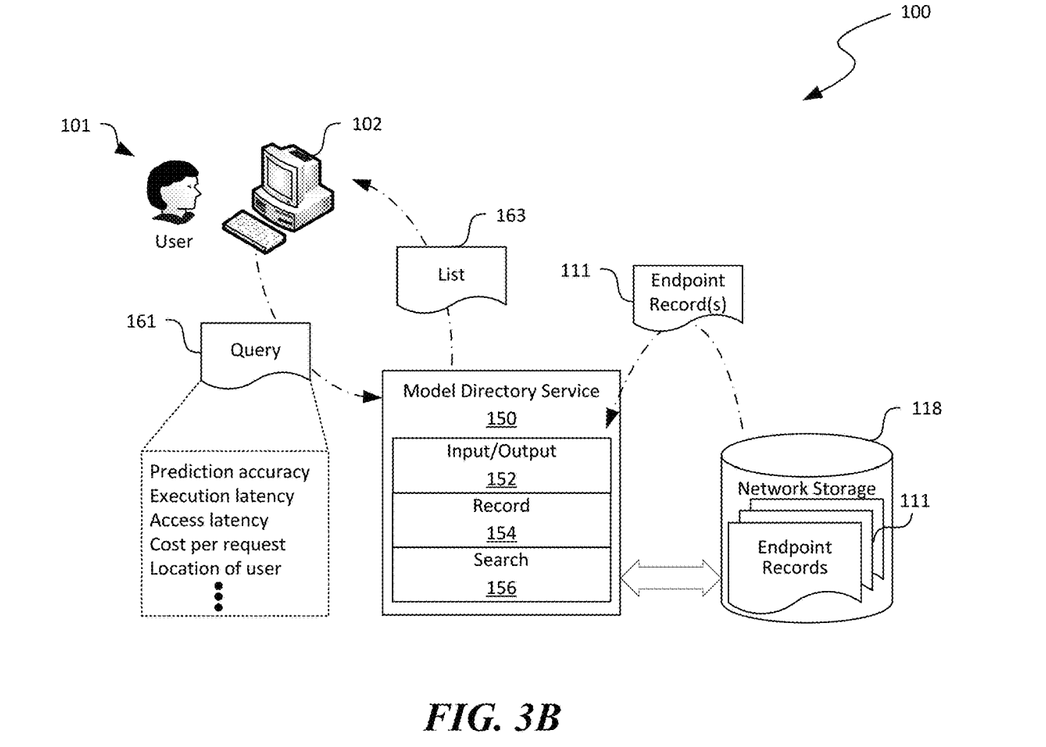

The search component 156 of the model directory service 150 can be configured to facilitate efficient discovery of inferencing endpoints in the distributed computing system 100. For example, as shown in FIG. 3B, a user 101 can submit a query 161 for inferencing endpoints via a client device 102 to the model directory service 150. In the illustrated example, the query 161 can include multiple criteria including, inter alia, prediction accuracy, execution latency, access latency, and cost per request. The query 161 can also include additional data or metadata identifying a physical location of the user 101 and/or other suitable information. Upon receiving the query 161, the input/output component 152 can be configured to authenticate the query 161 using, for instance, an authentication token (not shown) attached to the query 161. Upon authenticating the query, the input/output component 152 can be configured to forward the query 161 to the search component 156 for further processing.

The search component 156 can be configured to search the endpoint records 111 in the network storage 118 based on the user supplied criteria. For example, the search component 156 can be configured to implement fuzzy logic to locate one or more inferencing endpoints having an execution latency of 50 to 100 milliseconds, a prediction accuracy of 80% to 90%, a cost of performing prediction of 0.10 dollars per request, and/or other suitable criteria. In other examples, the search component 156 can also be configured to determine, from the received query 161, a physical location of the user 101, and locate one or more inferencing endpoints that are geographically closest to the physical location of the user 101. In further examples, the search component 156 can also be configured to filter the endpoint records 111 of corresponding inferencing endpoints for privacy and/or government compliance. For instance, due to privacy and/or government compliance concerns, some inferencing endpoints may not be available only to users 101 in certain physical locations.

Figure 3C:
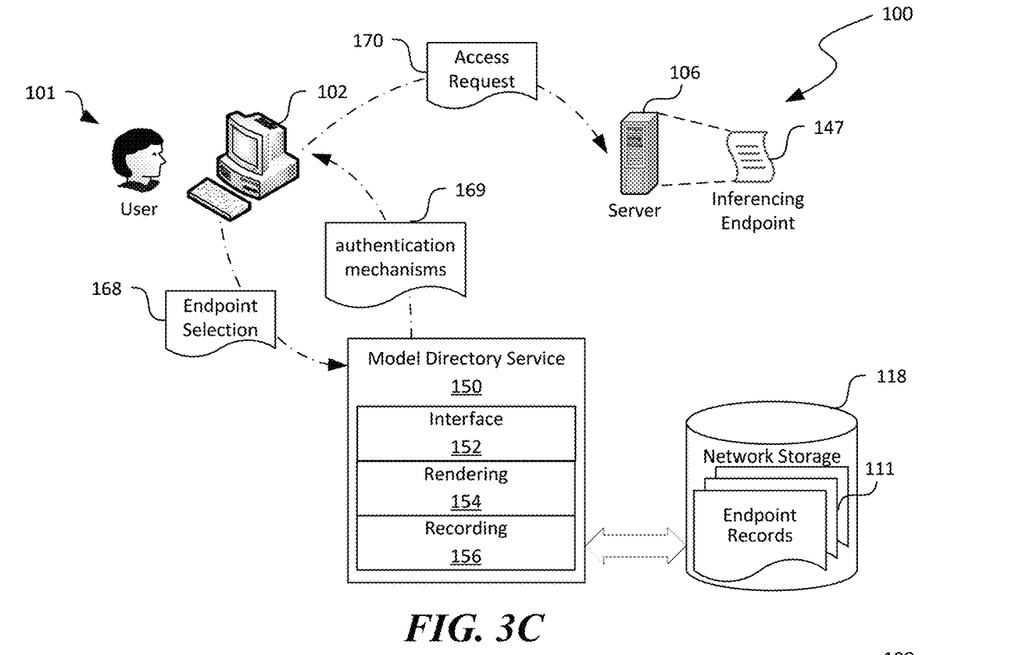

In certain embodiments, upon obtaining the list 163 of inferencing endpoints, the search component 156 can be configured to provide the list 163 of inferencing endpoints along with available authentication mechanisms 169 (shown in FIG. 3C) to access the inferencing endpoints to the user 101 via the input/output component 152. In other embodiments, as shown in FIG. 3C, the search component 156 can be configured to provide the authentication mechanisms 169 upon receiving an endpoint selection 168 from the user 101.

In certain implementations, the search component 156 can be configured to provide a Universal Resource Locator (URL) and a certificate thumbprint corresponding to each of the inferencing endpoints in the list 163. Upon receiving the list 163, the user 101 can locate a suitable authentication certificate from, for instance, a local store or a network store, and access one of the inferencing endpoints at a corresponding URL with the authentication certificate. In other implementations, the search component 156 can also be configured to provide the list 163 of inferencing endpoints ranked based on a geographical distance from the physical location of the user 101, an execution latency, a prediction accuracy, or other suitable criteria, for selection by the user 101. Based on the URLs in the list 163 and corresponding authentication mechanisms 169, the user 101 can select one or more inferencing endpoint and transmit data representing an access request 170 to a server 106 hosting an application 147 corresponding to the selected inferencing endpoint.

Figure 3D:
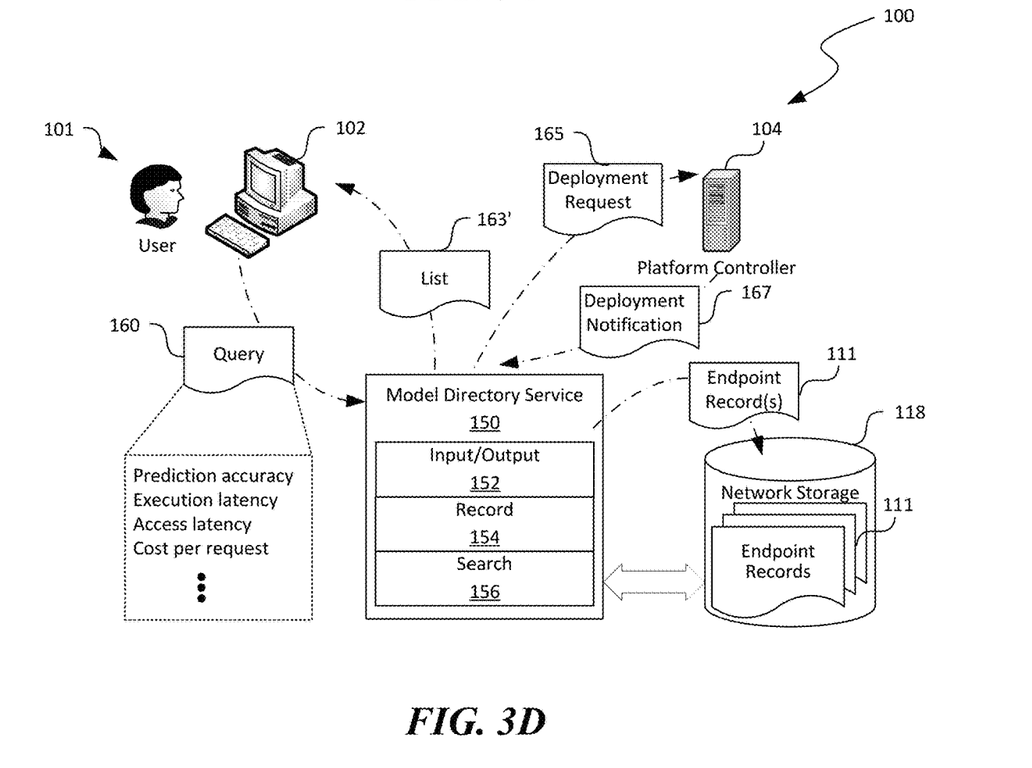

In further embodiments, as shown in FIG. 3D, the search component 156 can be configured to determine a count of the inferencing endpoints in the list 163 (shown in FIG. 3B) and whether the determined number is equal or exceed a preset threshold. In response to determine that the count of inferencing endpoints in the list 163 is less than the preset threshold, in certain implementations, the search component 156 can be configured to prompt the user 101 to modify the previously supplied query 160 (shown in FIG. 3A) to, for instance, broaden ranges for the search. For instance, instead of a prediction accuracy of 80% to 90%, the prediction accuracy can be set to 70% to 90%. After receiving modified search criteria, the search component 156 can then re-query the endpoint records 111 with the modified criteria and determine whether a new count of inferencing endpoints in the list is equal or exceed the preset threshold. The foregoing operations can be repeated until the count of inferencing endpoints in the list 163 is not less than the preset threshold.

In other embodiments, in addition to or in lieu of prompting the user 101 to modify the search criteria, the search component 156 can be configured to generate and transmit a deployment request 165 to, for instance, the platform controller 104 to instantiate a new inferencing endpoint. In certain implementations, the new inferencing endpoint can be instantiated based at least in part on the search criteria supplied by the user 101. For instance, in the example above, the new inferencing endpoint can be instantiated to have characteristics of an execution latency of 50 to 100 milliseconds, a prediction accuracy of 80% to 90%, a cost of performing prediction of 0.10 dollars per request. Upon receiving a deployment notification 167 from the platform controller 104 that the new inferencing endpoint is instantiated, the search component 156 can be configured to provide the instantiated new inferencing endpoint to the user 101. In further implementations, multiple new inferencing endpoints can be instantiated such that the total number of inferencing endpoints in the list 163 is not less than the preset threshold. The search component 156 can also be configured to update and/or supplement the list 163' with the newly deployed inferencing endpoint(s) for selection by the user 101 as well as generate and/or update endpoint record(s) 111 corresponding to the newly deployed inferencing endpoint(s) in the network storage 118.

Several embodiments of the disclosed technology can allow efficient discovery and access of inferencing endpoints in the distributed computing system 100. By recording and tracking the deployed inferencing endpoints, the model directory service 150 can efficiently provide inferencing endpoints that are suitable to desired parameters of the user 101. Instead of trying out each inferencing endpoint, the user 101 can readily determine, from the provided list, a most suitable inferencing endpoint. The model directory service 150 can also reduce resource consumption in the distributed computing system 100. For example, instead of instantiating a new inferencing endpoint in response to every request from the user 101, an existing inferencing endpoint that satisfies the requirements of the user 101 can be provided. As such, compute, storage, network, and/or other suitable types of resources in the distributed computing system 100 can be reduced.

Figure 4A:
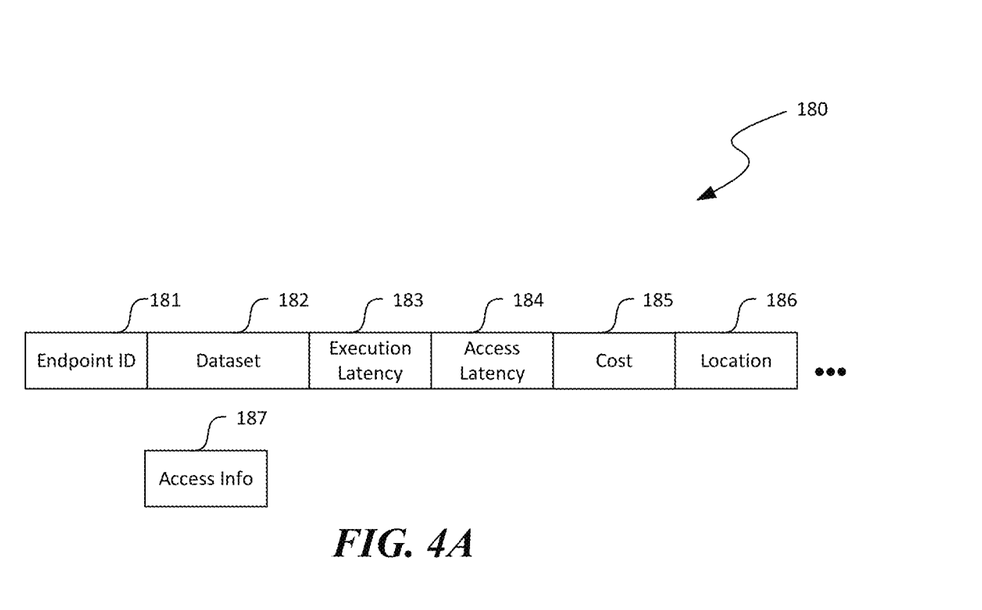
FIGS. 4A and 4B are schematic diagrams illustrating example data structure useful for containing information of inferencing endpoints in accordance with embodiments of the disclosed technology.
Figure 4B:
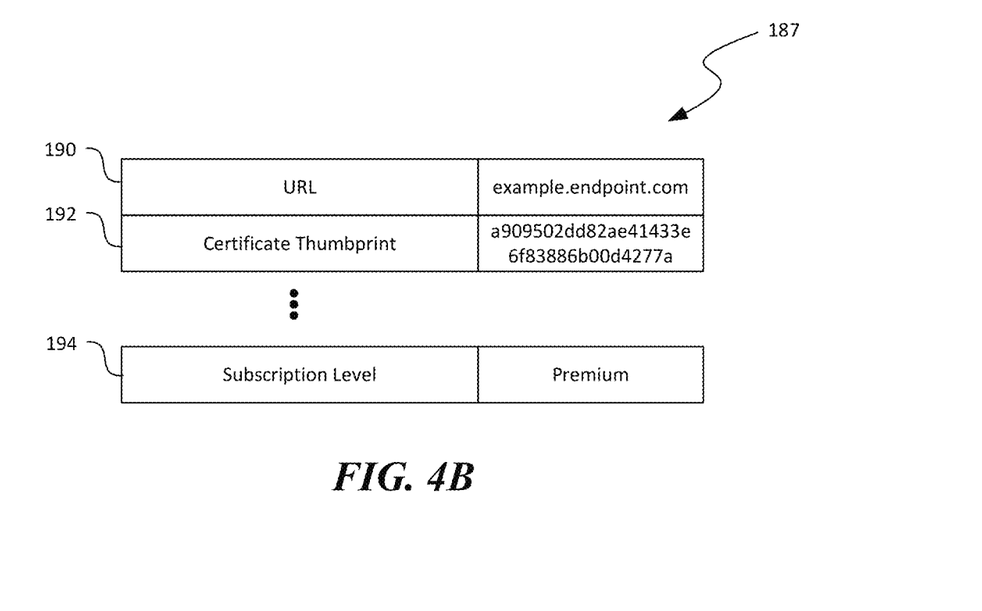

FIGS. 4A and 4B are schematic diagrams illustrating example data structures useful for containing information of inferencing endpoints in accordance with embodiments of the disclosed technology. As shown in FIG. 4A, a data structure 180 can include multiple data fields configured to contain corresponding information. For instance, the data structure 180 can include an endpoint ID field 181, a dataset filed 182, an execution latency field 183, an access latency field 184, a cost field 185, a location field 186, and an access info field 187. The endpoint ID field 181 can be configured to contain data representing an identifier of an inferencing endpoint. The dataset field 182 can be configured to contain an identifier (e.g., a version number) of a dataset used to train a machine learning model utilized by the inferencing endpoint. The execution latency field 183 and the access latency field 184 can be configured to contain data representing an execution and network access latency, respectively, of the inferencing endpoint. The cost field 185 can be configured to contain a cost per request for invoking the inferencing endpoint. The location field 186 can be configured to contain data representing a geographical location at which the inferencing endpoint is deployed. The access info field 187 can be configured to include one or more sub-fields that contain data representing a network location, an authentication hint, a subscription level, and/or other suitable types of information related to the inferencing endpoint. Example sub-fields of the access info field 187 are described below in more detail with reference to FIG. 4B.

As shown in FIG. 4B, the access info field 187 can include an URL field containing a network location of the inferencing endpoint (e.g., "example.endpoint.com"). The access info field 187 can also include a certificate thumbprint sub-field 192 containing a certificate thumbprint (e.g., "a909502dd82ae41433e6f83886b00d4277a") of a certificate needed to access the inferencing endpoint. The access info field 187 can further include a subscription level sub-field 194 containing data indicating a subscription level needed to access the inferencing endpoint (e.g., "Premium"). Though particular sub-fields are shown in FIG. 4B for illustration purposes, in other implementations, the access info field 187 can include additional and/or different sub-fields in addition to or in lieu of those shown in FIG. 4B.

Figure 5A:
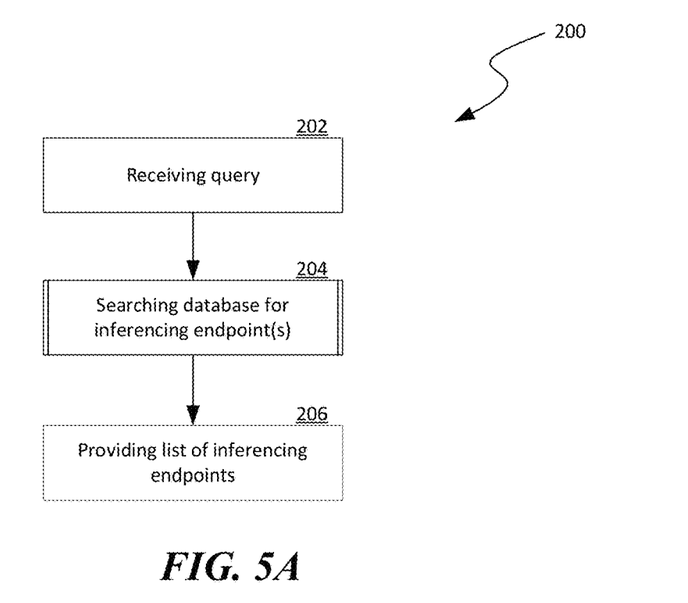
FIGS. 5A and 5B are flowchart illustrating example processes of inferencing endpoint discovery in accordance with embodiments of the disclosed technology.
Figure 5B:
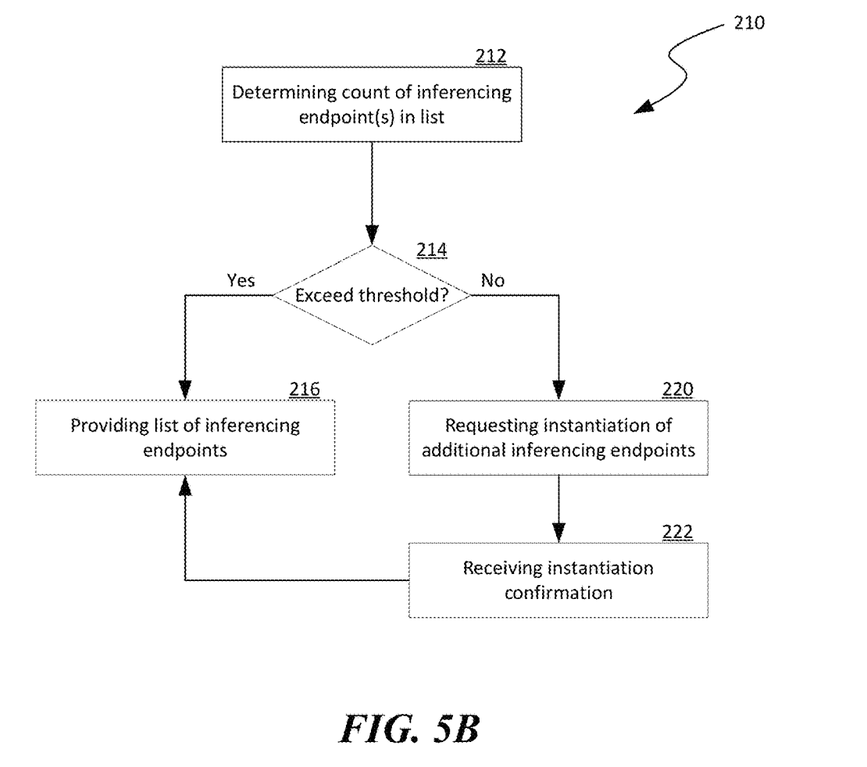

FIGS. 5A and 5B are flowchart illustrating example processes of inferencing endpoint discovery in accordance with embodiments of the disclosed technology. Though the processes are described below in the context of the distributed computing system 100 of FIG. 1, in other embodiments, the processes can be implemented in other computing systems with additional and/or different components than those shown in FIGS. 1 and 2.

As shown in FIG. 5A, a process 200 can include receiving a query for deployed inferencing endpoints at stage 202. The query can include various searching criteria such as prediction accuracy, execution latency, and/or other suitable desired characteristics of the inferencing endpoints. The process 200 can further include searching a database for inferencing endpoints that satisfy the searching criteria in the query at stage 204. For example, fuzzy logic can be implemented to locate one or more inferencing endpoints having an execution latency of 50 to 100 milliseconds, a prediction accuracy of 80% to 90%, a cost of performing prediction of 0.10 dollars per request, and/or other suitable criteria. In other examples, a physical location of the user can be determined to locate one or more inferencing endpoints that are geographically closest to the physical location of the user. In further examples, the inferencing endpoints can be filtered for privacy and/or government compliance. In yet further examples, searching the database can include additional operations such as those described in more detail below with reference to FIG. 5B. Upon searching the database for inferencing endpoints, the process 200 can include providing the list of inferencing endpoints in response to the received query at stage 202.

As shown in FIG. 5B, example operations of searching the database can include determining a count of inferencing endpoints in a list that satisfy the user supplied criteria at stage 212. The operations can then include a decision stage 214 to determine whether the determined count is equal to or greater than a preset threshold. In response to determining that the count is equal to or greater than the preset threshold, the operations proceed to providing the list of inferencing endpoints to the user at stage 216. Otherwise, the operations proceed to requesting, for instance, the platform controller 104 of FIG. 1, to instantiate one or more additional inferencing endpoints at stage 220. Upon receiving an instantiation confirmation at stage 222, the operations can proceed to providing the list of inferencing endpoints to the user at stage 216.

Figure 6:
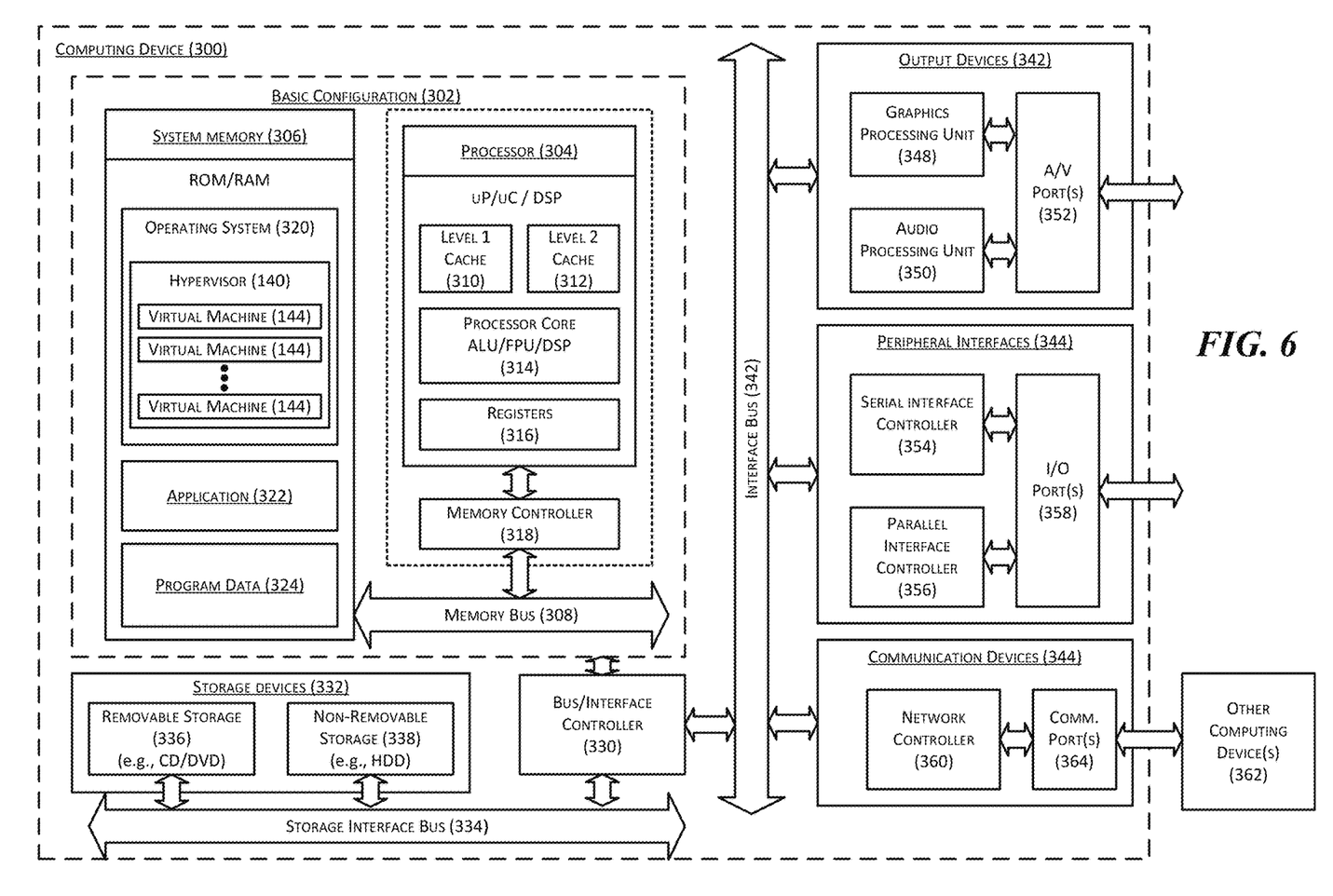
FIG. 6 is a computing device suitable for certain components of the distributed computing system in FIG. 1.

FIG. 6 is a computing device 300 suitable for certain components of the distributed computing system 100 in FIG. 1, for example, the server 106, the client device 102, or the platform controller 104. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 6, the operating system 320 can include a hypervisor 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of inferencing endpoint discovery in a distributed computing system having multiple servers individually hosting one or more inferencing endpoints, the method comprising:
    receiving, at a server in the distributed computing system, a query for inferencing endpoints deployed in the distributed computing system, the query including data representing individual target values corresponding to an execution latency or a prediction accuracy of the inferencing endpoints; and
    in response to receiving the query, at the server,
        conducting a search of a database containing endpoint records individually having data representing values of the execution latency or prediction accuracy corresponding to one of the inferencing endpoints deployed in the distributed computing system; and
        based on the conducted search,
            generating a list of inferencing endpoints matching the individual target values corresponding to the execution latency or prediction accuracy included in the received query;
            identifying a network location and a certificate thumbprint for the individual inferencing endpoints in the generated list;
            determining whether a count of the inferencing endpoints in the generated list exceeds a preset threshold;
            in response to determining that the identified count does exceeds the preset threshold, providing the generated list identifying the inferencing endpoints matching the individual target values and corresponding network locations and certificate thumbprints as a query result in response to the received query; and
            in response to determining that the identified count does not exceed the preset threshold, instantiating one or more additional inferencing endpoints based on the individual target values corresponding to the execution latency or prediction accuracy in the received query.

2. The method of claim 1, further comprising:
    in response to determining that the identified count does not exceed the preset threshold,
        receiving data representing a deployment notification of the one or more additional inferencing endpoints in the distributed computing system; and
        updating the generated list to include at least one of the one or more additional inferencing endpoints deployed in the distributed computing system.

3. The method of claim 1 wherein:
    the query further includes data identifying a geographical location of a user submitting the query; and
    the method further includes sorting the generated list of the inferencing endpoints based on a physical distance between the individual inferencing endpoints and the geographical location of the user.

4. The method of claim 1 wherein:
the query further includes data identifying a geographical area of a user submitting the query; and
the method further includes filtering the generated list of the inferencing endpoints to remove one or more inferencing endpoints that are physically located outside of a geographical area of the user.

5. The method of claim 1 wherein:
the query further includes data identifying a geographical area of a user submitting the query; and
the method further includes filtering the generated list of the inferencing endpoints to remove one or more inferencing endpoints that are not accessible to the user due to privacy and/or government compliance concerns in the geographical area of the user.

6. A method of inferencing endpoint discovery in a distributed computing system having multiple servers individually hosting one or more inferencing endpoints, the method comprising:
receiving, at a server in the distributed computing system, a query for inferencing endpoints deployed in the distributed computing system, the query including data representing individual target values corresponding to an execution latency or a prediction accuracy of the inferencing endpoints; and
in response to receiving the query, at the server,
conducting a search of a database containing endpoint records individually having data representing values of the execution latency or prediction accuracy corresponding to one of the inferencing endpoints deployed in the distributed computing system;
based on the conducted search,
generating a list of inferencing endpoints matching the individual target values corresponding to the execution latency or prediction accuracy included in the received query; and
identifying a network location and a certificate thumbprint for the individual inferencing endpoints in the generated list; and
providing the generated list identifying the inferencing endpoints matching the individual target values and corresponding network locations and certificate thumbprints as a query result in response to the received query.

7. The method of claim 6, further comprising:
identifying a count of the inferencing endpoints in the generated list;
determining whether the identified count of the inferencing endpoints in the list exceeds a preset threshold; and
in response to determining that the identified count does not exceed the preset threshold, transmitting, via a computer network, a request to instantiate one or more additional inferencing endpoints based on the individual target values corresponding to the execution latency or prediction accuracy in the received query.

8. The method of claim 6, further comprising:
identifying a count of the inferencing endpoints in the generated list;
determining whether the identified count of the inferencing endpoints in the list exceeds a preset threshold; and
in response to determining that the identified count does exceeds the preset threshold, providing the generated list identifying the inferencing endpoints matching the individual target values and corresponding network locations and certificate thumbprints as a query result in response to the received query.

9. The method of claim 6, further comprising:
identifying a count of the inferencing endpoints in the generated list;
determining whether the identified count of the inferencing endpoints in the list exceeds a preset threshold; and
in response to determining that the identified count does not exceed the preset threshold,
transmitting, via a computer network, a request to instantiate one or more additional inferencing endpoints based on the individual target values corresponding to the execution latency or prediction accuracy in the received query;
receiving data representing a deployment notification of the one or more additional inferencing endpoints in the distributed computing system; and
updating the generated list to include at least one of the one or more additional inferencing endpoints deployed in the distributed computing system.

10. The method of claim 6, further comprising:
identifying a count of the inferencing endpoints in the generated list;
determining whether the identified count of the inferencing endpoints in the list exceeds a preset threshold; and
in response to determining that the identified count does not exceed the preset threshold,
transmitting, via a computer network, a request to instantiate one or more additional inferencing endpoints, the request identifying individual values of the execution latency or prediction accuracy, wherein the identified individual values match or exceed the individual target values contained in the received query;
receiving data representing a deployment notification of the one or more additional inferencing endpoints in the distributed computing system and corresponding values of the execution latency or prediction accuracy as deployed; and
updating the generated list to include at least one of the one or more additional inferencing endpoints deployed in the distributed computing system.

11. The method of claim 6, further comprising:
identifying a count of the inferencing endpoints in the generated list;
determining whether the identified count of the inferencing endpoints in the list exceeds a preset threshold; and
in response to determining that the identified count does not exceed the preset threshold,
transmitting, via a computer network, a request to instantiate one or more additional inferencing endpoints based on the individual target values corresponding to the execution latency or prediction accuracy in the received query;
receiving data representing a deployment notification of the one or more additional inferencing endpoints in the distributed computing system and corresponding values of the execution latency or prediction accuracy as deployed; and
generating and storing, in the database, one or more additional endpoint records corresponding to the one or more additional inferencing endpoints deployed in the distributed computing system, the one or more additional endpoint records containing the corresponding values of the execution latency or prediction accuracy as deployed.

12. The method of claim 6 wherein:
the query further includes data identifying a geographical location of a user submitting the query; and the method further includes sorting the generated list of the inferencing endpoints based on a physical distance between the individual inferencing endpoints and the geographical location of the user.

13. The method of claim 6 wherein:
the query further includes data identifying a geographical area of a user submitting the query; and
the method further includes filtering the generated list of the inferencing endpoints to remove one or more inferencing endpoints that are physically located outside of a geographical area of the user.

14. The method of claim 6 wherein:
the query further includes data identifying a geographical area of a user submitting the query; and
the method further includes filtering the generated list of the inferencing endpoints to remove one or more inferencing endpoints that are not accessible to the user due to privacy and/or government compliance concerns in the geographical area of the user.

15. A computing device in a distributed computing system having multiple servers individually hosting one or more inferencing endpoints, the computing device comprising:
a processor;
a memory containing instructions executable by the processor to cause the computing device to:
upon receiving a query for inferencing endpoints deployed in the distributed computing system,
conduct a search of a database containing endpoint records individually having data representing values of an execution latency or a prediction accuracy corresponding to one of the inferencing endpoints deployed in the distributed computing system;
based on the conducted search,
generate a list of inferencing endpoints matching individual target values corresponding to the execution latency or prediction accuracy included in the received query; and
identify a network location and a certificate thumbprint for the individual inferencing endpoints in the generated list; and
transmit the generated list identifying the inferencing endpoints matching the individual target values and corresponding network locations and certificate thumbprints as a query result in response to the received query.

16. The computing device of claim 15 wherein the memory includes additional instructions executable by the processor to cause the processor to:
identify a count of the inferencing endpoints in the generated list;
determine whether the identified count of the inferencing endpoints in the list exceeds a preset threshold; and
in response to determining that the identified count does not exceed the preset threshold, transmit, via a computer network, a request to instantiate one or more additional inferencing endpoints based on the individual target values corresponding to the execution latency or prediction accuracy in the received query.

17. The computing device of claim 15 wherein the memory includes additional instructions executable by the processor to cause the processor to:
identify a count of the inferencing endpoints in the generated list;
determine whether the identified count of the inferencing endpoints in the list exceeds a preset threshold; and
in response to determining that the identified count does exceeds the preset threshold, transmit the generated list identifying the inferencing endpoints matching the individual target values and corresponding network locations and certificate thumbprints as a query result in response to the received query.

18. The computing device of claim 15 wherein the memory includes additional instructions executable by the processor to cause the processor to:
identify a count of the inferencing endpoints in the generated list;
determine whether the identified count of the inferencing endpoints in the list exceeds a preset threshold; and
in response to determining that the identified count does not exceed the preset threshold,
transmit, via a computer network, a request to instantiate one or more additional inferencing endpoints based on the individual target values corresponding to the execution latency or prediction accuracy in the received query;
receive data representing a deployment notification of the one or more additional inferencing endpoints in the distributed computing system; and
update the generated list to include at least one of the one or more additional inferencing endpoints deployed in the distributed computing system.

19. The computing device of claim 15 wherein the memory includes additional instructions executable by the processor to cause the processor to:
identify a count of the inferencing endpoints in the generated list;
determine whether the identified count of the inferencing endpoints in the list exceeds a preset threshold; and
in response to determining that the identified count does not exceed the preset threshold,
transmit, via a computer network, a request to instantiate one or more additional inferencing endpoints based on the individual target values corresponding to the execution latency or prediction accuracy in the received query;
receive data representing a deployment notification of the one or more additional inferencing endpoints in the distributed computing system and corresponding values of the execution latency or prediction accuracy as deployed; and
generate and store, in the database, one or more additional endpoint records corresponding to the one or more additional inferencing endpoints deployed in the distributed computing system, the one or more additional endpoint records containing the corresponding values of the execution latency or prediction accuracy as deployed.

20. The computing device of claim 15 wherein:
the query further includes data identifying a geographical location of a user submitting the query; and
the memory includes additional instructions executable by the processor to cause the processor to:
sort the generated list of the inferencing endpoints based on a physical distance between the individual inferencing endpoints and the geographical location of the user; or
filter the generated list of the inferencing endpoints to remove one or more inferencing endpoints that are physically located outside of a geographical area of the user.

* * * * *